May 12, 1942.  G. ZOLLER  2,283,146

DYNAMO-ELECTRIC MACHINE

Filed Jan. 31, 1941

Inventor:
George Zoller,
by Harry E. Dunham
His Attorney.

Patented May 12, 1942

2,283,146

UNITED STATES PATENT OFFICE 2,283,146

DYNAMOELECTRIC MACHINE

George Zoller, Fort Wayne, Ind., assignor to General Electric Company, a corporation of New York Application January 31, 1941, Serial No. 376,793

9 Claims. (Cl. 171—206)

My invention relates to dynamo-electric machines and more particularly to an improved rotatable member and slot wedge for such machines.

In dynamo-electric machines having rotatable members provided with commutators, it has been found that carbon dust from the wearing away of the brushes on the commutator tends to collect in the end of the winding slots, causing the breakdown of the winding insulation.

An object of my invention is to provide an improved dynamo-electric machine rotatable member constructed to seal the ends of the winding slots adjacent the commutator.

Another object of my invention is to provide an improved dynamo-electric machine slot wedge.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
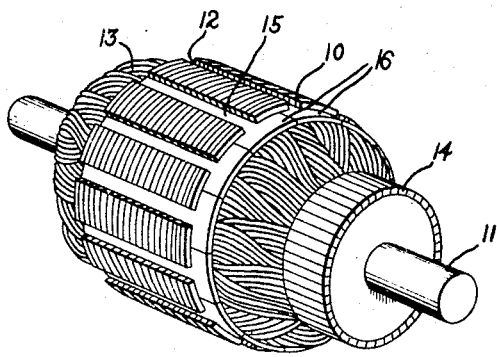
Figure 2:
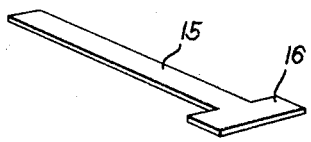
Figure 3:
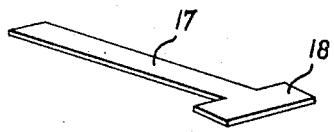

In the drawing, Fig. 1 is a perspective view of a dynamo-electric machine armature provided with my improved winding slot sealing arrangement; Fig. 2 is a perspective view of a slot wedge such as is shown in Fig. 1; Fig. 3 is a modification of the slot wedge shown in Fig. 2 wherein the longitudinally extending element of the wedge is arranged at an angle other than 90 degrees with respect to the transversely extending element for use in a rotatable member having skewed slots; and Fig. 4 illustrates a further modification of the slot wedge wherein the transversely extending element extends entirely to one side of the longitudinally extending wedge element.

Referring to the drawing, I have shown in Fig. 1 a dynamo-electric machine rotatable member having a laminated core 10 of magnetic material mounted upon a shaft 11. The core is provided with winding slots 12 in which is arranged the coil sides of a winding 13. In order to supply electric current to the winding 13, the ends of the coils are electrically connected to the segments of a commutator 14 which is insulated from and supported on the shaft 11. The sides of the winding 13 within the winding slots 12 are retained in position by a plurality of winding slot wedges of insulating material having longitudinally extending elements 15 arranged within the slots 12 above the winding 13. These slot wedges are T-shaped and of substantially uniform thickness, as shown in Fig. 2, with a transversely extending element 16 wider than the longitudinally extending element 15 formed adjacent an end of the longitudinally extending element 15 and extending on each side thereof. These slot wedges are arranged in the slots so that the outer edges of the transversely extending elements are in substantially abutting relationship so as to provide a substantially continuous annulus about the winding adjacent the commutator for sealing the adjacent ends of the winding slots. When the winding has been completely formed, it presses tightly into this annulus, and foreign substances, such as carbon dust from the commutator brushes, are prevented from entering the winding by the slot wedges cooperating with insulating varnish which is applied to the winding by dipping of the armature into the varnish and then baking the assembly in any conventional manner.

In some instances, the winding slots of the rotatable member of a dynamo-electric machine may not be parallel to the axis of the machine, but may be skewed in order to provide a more quiet operating machine. The slot wedge shown in Fig. 3 is constructed with the longitudinally extending element 17 at an angle other than 90 degrees with respect to the transversely extending element 18 adjacent one end of the wedge. The angle of the element 17 with respect to the element 18 may be changed as desired to correspond to the skewing of the winding slots with respect to the radial face of the core of the rotatable member.

Figure 4:
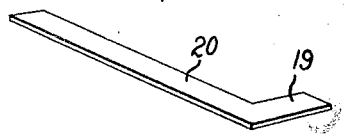

In Fig. 4, is shown a further modification of the slot wedge wherein a transversely extending element 19 extends to one side of the longitudinally extending wedge element 20 and provides an L-shaped slot wedge. As in the other instances, this wedge is preferably formed of insulating material, and the longitudinally extending element 20 is adapted to be arranged over the sides of a rotatable member winding with the transversely extending element 19 of each slot wedge extending in substantially the same direction about the periphery of the winding. The transversely extending wedge element 19 is of a length substantially equal to the distance between adjacent winding slots of the rotatable member so that when all the wedges are in assembled relationship in the winding slots, the outer edges of the transversely extending elements are arranged in abutting relationship to provide a substantially continuous annulus about the winding adjacent the commutator end of the slots, similar to the construction shown in Fig. 1.

While I have illustrated and described various embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A dynamo-electric machine rotatable member having a core with winding slots formed therein, a winding in said slots, and means including slot wedges extending into said slots over said winding and having transversely extending elements adjacent an end thereof arranged in substantially abutting relationship for sealing the adjacent ends of said slots.

2. A dynamo-electric machine rotatable member having a core with winding slots formed therein, a winding in said slots, a commutator connected to said winding, and means including slot wedges extending into said slots over said winding and having transversely extending elements adjacent the commutator end of said windings arranged in substantially abutting relationship for sealing the adjacent ends of said slots.

3. A dynamo-electric machine rotatable member having a core with winding slots formed therein, a winding in said slots, slot wedges extending into said slots over said winding and having transversely extending elements adjacent an end thereof arranged in substantially abutting relationship to provide a substantially continuous annulus about said winding at the adjacent ends of said slots, means including said substantially continuous annulus and insulating material applied to said winding adjacent said annulus for sealing the adjacent ends of said slots.

4. A dynamo-electric machine rotatable member having a core with winding slots formed therein, a winding in said slots, a commutator connected to said winding, and means including T-shaped slot wedges extending into said slots over said windings with the transversely extending ends thereof arranged in substantially abutting relationship to provide a substantially continuous annulus about said winding adjacent said commutator for sealing the adjacent ends of said slots.

5. A dynamo-electric machine rotatable member having a core with winding slots formed therein, a winding in said slots, a commutator connected to said winding, and means including L-shaped slot wedges extending into said slots over said windings with the transversely extending ends thereof arranged in substantially abutting relationship adjacent said commutator for sealing the adjacent ends of said slots.

6. A dynamo-electric machine rotatable member having a core with winding slots formed therein, a winding in said slots, L-shaped slot wedges extending into said slots over said winding with the transversely extending ends thereof substantially as long as the distance between adjacent slots, and means including the arrangement of said transversely extending ends in substantially abutting relationship to provide a substantially continuous annulus about said winding for sealing the adjacent ends of said slots.

7. A dynamo-electric machine winding slot wedge formed of insulating material having a longitudinally extending element and a transversely extending element adjacent an end of said longitudinally extending element.

8. A dynamo-electric machine T-shaped winding slot wedge formed of insulating material having a longitudinally extending element and another element wider than said longitudinally extending element adjacent an end of said longitudinally extending element extending transversely thereto and on each side thereof.

9. A dynamo-electric machine L-shaped winding slot wedge formed of insulating material having a longitudinally extending element and another element wider than said longitudinally extending element adjacent an end of said longitudinally extending element extending transversely thereto and to one side thereof.

GEORGE ZOLLER.